3,110,723
PROCESS FOR PREPARING MONOCHLORINATED CYANOESTERS

Peter L. De Benneville, Philadelphia, and Heinz W. Blessing, Levittown, Pa., assignors to Rohm & Haas Company, Philadelphia, Pa., a corporation of Delaware
No Drawing. Filed Aug. 18, 1959, Ser. No. 834,411
2 Claims. (Cl. 260—465.4)

This invention deals with monochlorinated cyanoesters and, more particularly, with 3-chloro-3-cyanoesters. It further deals with the preparation of these monochlorinated cyanoesters.

The compounds of the present invention may be represented by the formula

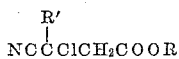

in which R represents primary and secondary alkyl groups of from 1 to 8 carbon atoms, such as methyl, ethyl, propyl, isopropyl, n-butyl, n-octyl, and 2-ethylhexyl, and R' represents an alkyl group of 1 to 4 carbon atoms, such as methyl, ethyl, isopropyl, and tert-butyl.

The compounds of this invention are produced by chlorinating a compound having the formula

in which the symbols represent the same groups as discussed hereinbefore. Typical reactants include methyl 3-cyanobutyrate, ethyl 3-cyanopentanoate, isopropyl 3-cyanohexanoate, butyl 3-cyanoheptanoate, and octyl 3-cyanobutyrate. By rigidly adhering to the reactants just defined and employing the conditions to be more fully discussed hereinafter, consistently high yields of the desired product are repeatedly obtained. It is to be noted in this respect that, unlike many chlorinations known to the prior art, the present method produces the monochlorinated compound, wherein the chlorine atom is always located in the previously shown structural position. There are no other chlorinated products obtained in the present method in any appreciable amounts. The chlorination always occurs in the manner described. This specificity apparently arises from the structural condition

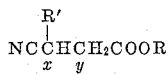

in which it has been surprisingly found that reaction is favored to replace the hydrogen atom on the carbon atom labelled $x$, whereas replacement of the hydrogen atom on the carbon atom labelled $y$ is inhibited. In the absence of this structural restriction, chlorinations are highly unpredictable.

The present process is conducted by passing chlorine into a reaction vessel containing a cyanoester reactant. The chlorine may be employed in a liquid or a gaseous form, but it is preferred to use it in the gaseous form and bubble it up through the cyanoester reactant. It is desirable to saturate the reaction medium with hydrogen chloride in gaseous form and substantially dry before the introduction of the halogen itself. We have also found it sometimes advantageous to introduce hydrogen chloride in small amounts along with the chlorine. Particularly towards the end of the reaction, it appears to be preferable to maintain the reaction mixture in a condition of saturation with hydrogen chloride. This provides a more rapid reaction at this final stage.

The reaction is carried out in the substantial absence of actinic light although the presence of diffuse light is not objectionable. The reaction is continued until no more chlorine is taken up by the system, as will be clear to one skilled in the art. This will, in general, correspond to a gain in weight of slightly more than required for the substitution of one atom of chlorine because of the presence of dissolved gases.

It may be desirable in some instances to use small amounts of metallic chlorides in order to expedite the reaction, but such is not necessary. In this respect, there may be used zinc chloride, aluminum chloride, and the like.

The reaction is exothermic in nature and no heat need be added. In fact, it is desirable to conduct the reaction at a temperature no higher than 125° C. and preferably in the range of 35° to 85° C. Halogenation starts to occur in appreciable amounts at about 20° C. At the conclusion of the reaction, the reaction system is purged with nitrogen gas. The product may be further purified, if desired, by distillation.

The products of this invention are especially valuable as herbicides and are quite effective against dicotyledonous plants in both pre-emergence and post-emergence applications. These compounds are more effective when employed in post-emergence applications, according to standard procedures. The compounds of this invention are also useful herbicides against monocotyledonous plants, particularly in post-emergence applications. Maximum results are obtained when the present products are used in concentrations of about 10 pounds per acre and applied either as a spray, wettable powder, or dust in the known inert carriers. Particularly outstanding are the compounds in which R stands for methyl or ethyl and R' represents methyl. The products of this invention, when applied at the rate of 10 pounds per acre, give complete control of crab grass, millet, wild carrot, and pigweed and give excellent control of foxtail, lambs quarter, sorrel, dock, and mallow.

The compounds are also pesticides, being effective, for example, in the control of many pathogenic soil bacteria, fungi and leaf-chewing insects.

The compounds are also useful intermediates. They can be dehydrochlorinated with basic substances, such as alkali metal alkoxides, tertiary amines, and the like, to substituted cyanoacrylates, which are useful sources of α-substituted maleic and fumaric acid derivatives of known utility as plasticizers and constituents of polyesters and other polycondensates.

The present invention may be more fully understood from the following examples which are offered by way of illustration and not by way of limitation. Parts by weight are used throughout.

Example 1

A mixture of methyl 3-cyanobutyrate (101.7 parts) and anhydrous zinc chloride (2 parts) is saturated with dry hydrogen chloride at room temperature. A slow stream of chlorine gas containing about 1% of hydrogen chloride is then bubbled through the reactants at 23° to 37° C. for 42 hours in the absence of actinic light. The light yellow chlorination product is purged with nitrogen to remove dissolved gases. The gain in weight on chlorination (27.8 parts) corresponds to 100% monochlorination.

The product is distilled through a spinning band column to give 94 parts of a colorless oil, boiling point 80° C. at 5 mm. absolute pressure, $n_D^{25} = 1.4390$–$1.4400$. The oil analyzes correctly for methyl 3-cyano-3-chlorobutyrate. The product contains 21.85% chlorine (theoretical 21.94%), 8.60% nitrogen (theoretical 8.67%), 44.87% carbon (theoretical 44.60%) and 5.07% hydrogen (theoretical 4.99%).

In a similar fashion, from ethyl 3-cyanobutyrate, there is obtained ethyl 3-chloro-3-cyanobutyrate as a colorless liquid boiling at 50° to 70° C. at 1 mm.

In a similar fashion, from n-butyl 3-cyanobutyrate, there is obtained butyl 3-chloro-3-cyanobutyrate as a colorless liquid boiling at 60° to 80° C. at 0.5 mm.

*Example 2*

Into 100 parts of 2-ethylhexyl 3-cyanobutyrate is passed a stream of chlorine gas containing 1% hydrogen chloride at a temperature of 50° C. in the absence of actinic light, until chlorine is no longer absorbed. Nitrogen is then passed through the liquid at 50° C. until no more chlorine and hydrogen chloride are given off. The residue, a yellow oil, analyzes correctly for 2-ethylhexyl 3-chloro-3-cyanobutyrate.

In a similar manner, from 2-ethylhexyl 3-cyanoheptanoate is obtained a yellow oil analyzing correctly for 2-ethylhexyl 3-chloro-3-cyanoheptanoate.

In a similar manner, from isobutyl 3-cyanopentanoate is obtained a yellow oil analyzing correctly for isobutyl 3-chloro-3-cyanopentanoate.

We claim:

1. A method for the preparation of a compound having the formula

in which R represents a member from the group consisting of primary and secondary alkyl groups of from 1 to 8 carbon atoms and R' represents an alkyl group of 1 to 4 carbon atoms, which comprises chlorinating in the presence of hydrogen chloride and chlorine a compound having the formula

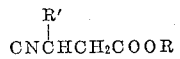

in the absence of actinic light at a temperature of about 20° to 125° C.

2. A process according to claim 1 in which the reaction is conducted in a medium saturated with hydrogen chloride and at a temperature of 35° to 85° C.

References Cited in the file of this patent

UNITED STATES PATENTS

| | | |
|---|---|---|
| 2,693,477 | Bader | Nov. 2, 1954 |
| 2,745,868 | Kabisch | May 15, 1956 |

OTHER REFERENCES

Beilsteins Handbuch der organischen Chemie, volume 2, page 640 (1920).

Treibs et al.: Ber., volume 90, pages 1146–1152 (1957).